H. H. MERCER & D. J. O'ROURKE.
STONEWORKING MACHINE.
APPLICATION FILED JULY 15, 1908.

1,250,608.

Patented Dec. 18, 1917.
3 SHEETS—SHEET 1.

Witnesses:
Horace A. Crossman
Edwin P. Luer

Inventors:
Daniel J. O'Rourke.
Henry H. Mercer.
by Emery & Booth
Attys

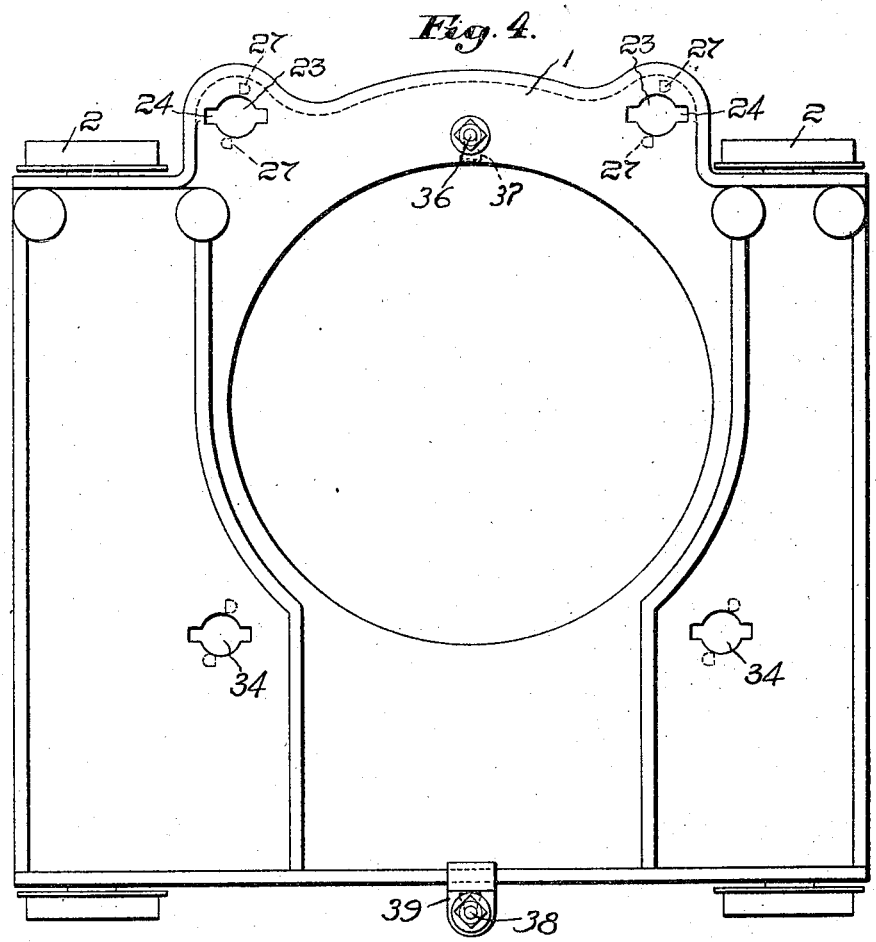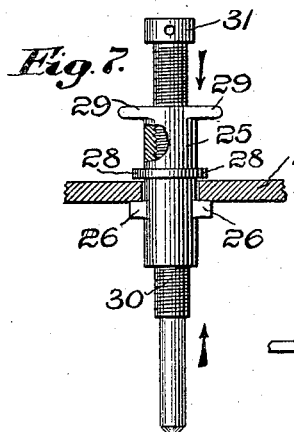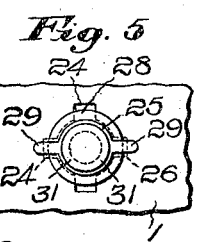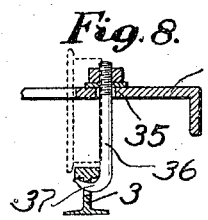

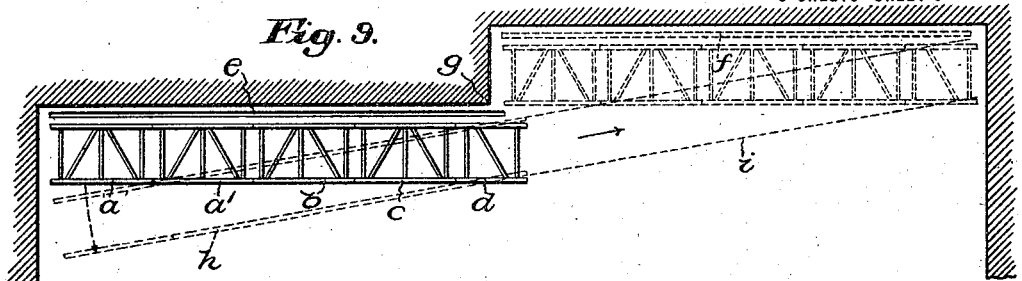
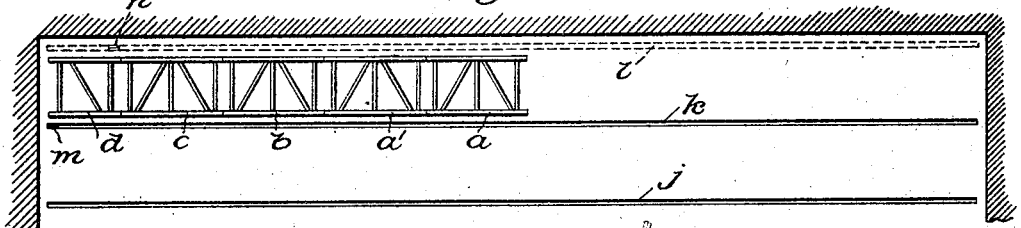
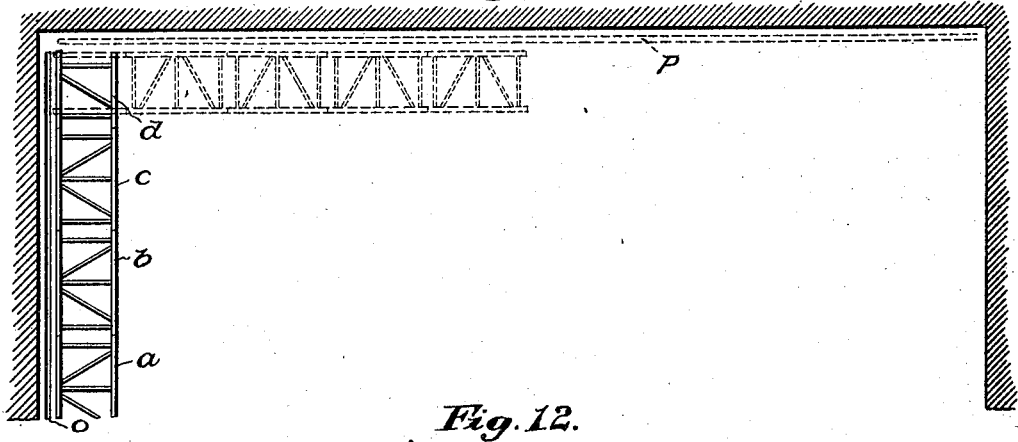
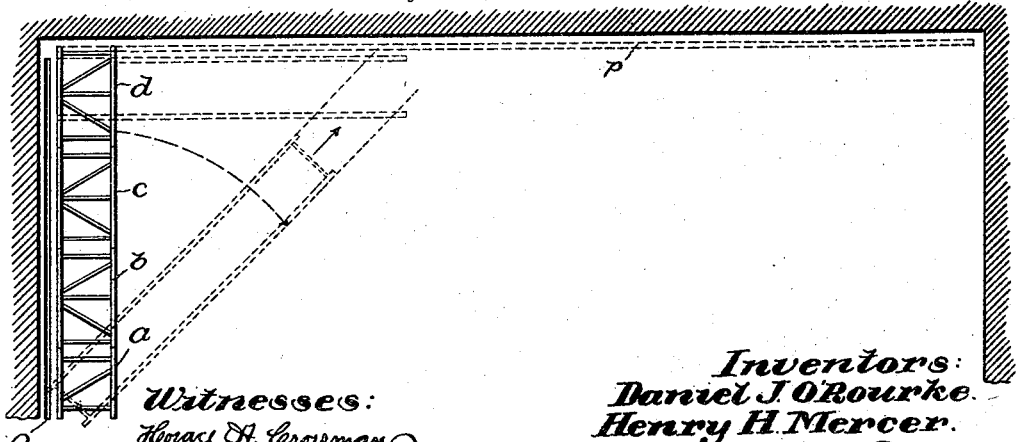
Inventors:
Daniel J. O'Rourke.
Henry H. Mercer.

UNITED STATES PATENT OFFICE.

HENRY H. MERCER AND DANIEL J. O'ROURKE, OF CLAREMONT, NEW HAMPSHIRE, ASSIGNORS, BY MESNE ASSIGNMENTS, TO SULLIVAN MACHINERY COMPANY, OF BOSTON, MASSACHUSETTS, A CORPORATION OF MASSACHUSETTS.

STONEWORKING-MACHINE.

1,250,608.      Specification of Letters Patent.      Patented Dec. 18, 1917.

Application filed July 15, 1908. Serial No. 443,707

*To all whom it may concern:*

Be it known that we, HENRY H. MERCER and DANIEL J. O'ROURKE, both citizens of the United States, and residents of Claremont, in the county of Sullivan and State of New Hampshire, have invented an Improvement in Stoneworking-Machines, of which the following description, in connection with the accompanying drawings, is a specification, like letters on the drawings representing like parts.

This invention relates to stone working machines, such as channelers or the like, being concerned more particularly with machines such as track channelers (which are used in connection with temporary and movable trackways) and means for facilitating the adjustment or transfer of such machines about the quarry when it becomes necessary to shift the supportting and guiding trackway or track section from one position to another for the purpose of continuing the cut already commenced or for starting a fresh cut.

In the use of track channelers it is customary to employ a trackway portion comprising several sections bolted together to form a continuous trackway of perhaps forty to forty-five feet in length. Each section is composed of a pair of parallel rails rigidly united and braced by cross-plates and stay rods. After the machine has cut as far as the length of trackway used will permit, if the cut is to be continued farther in the same direction, it becomes necessary to advance or extend the trackway longitudinally, so that the machine can continue the cut.

Heretofore this has ordinarily been accomplished by running the channeler over the more advanced track section, then unbolting the remaining section or sections from such advanced section and transferring such remaining section or sections to the advanced side of the channeler where it is then again bolted to the opposite end of the stationary section beneath the channeler. If the space is narrow or obstructions are met, it may be necessary to tip the entire trackway up edgewise and slide it or carry it along. This is not only a laborious operation, requiring, in addition to the men necessary for operating the machine, also the services of men to lift the track and carry it bodily around and to the front of the machine, but, as practised in the quarry, it consumes a great deal of time and materially reduces the efficiency of the machine as measured by the number of feet or yards which it can cut in a day's time.

Our invention contemplates the provision of means whereby the longitudinal shifting of the trackway may be accomplished in a relatively short time and without the necessity of unfastening the trackway sections, and furthermore, without the excessive labor and force required for lifting or dragging the track bodily around the machine. In carrying out our invention we preferably employ means whereby the channeler may be elevated sufficiently to relieve the track of all or a portion of its weight, so that the track can be drawn longitudinally beneath the channeler to an advanced position and the channeler again lowered upon the track for a fresh cut. Such an operation can be carried out in a relatively short time and ordinarily without the assistance of any additional help than is required to operate the machine itself.

Our invention further contemplates the provision of means for assisting in such other track adjustments as are required in ordinary quarry practice and materially reducing the necessary time and labor involved in handling the machine on the quarry floor. When it is required to shift the trackway to a position parallel to its preceding position, or to any position required for starting a fresh cut out of line with the preceding cut, it has heretofore been the custom to pry or bar the trackway to such fresh position with the full weight of the channeler resting upon the rails during such operation. This is invariably a laborious operation, requiring the labor of several additional helpers and frequently as much time as is required to complete the cut itself, it being usually necessary to put planks or metal bars under the rails to better enable the men to bar the track around with the machine resting upon it. By the use of our invention any required shifting of the trackway to a position out of line with its preceding position can be accomplished quickly and with very little labor.

Our invention will be best understood by reference to the following description when taken in connection with the accompanying illustration showing one specific embodiment thereof, while its scope will be more particularly pointed out in the appended claims.

In the drawings:

Fig. 4 is an outline plan of the main frame or carriage of the channeling machine shown in Figs. 1 and 2, showing the location of the elevating devices employed;

Fig. 5 is a plan, looking down in the direction of the arrow in Fig. 4, showing the elevating device;

Fig. 6 is a plan, looking up in the direction of the arrow, Fig. 4, showing the same elevating device from below;

Fig. 7 is a detail, partially in section, showing one form of elevating device;

Fig. 8 is a detail in section showing the rear holding device, and

Figs. 9, 10, 11 and 12 are diagrams illustrating the application of our invention.

Figure 1:
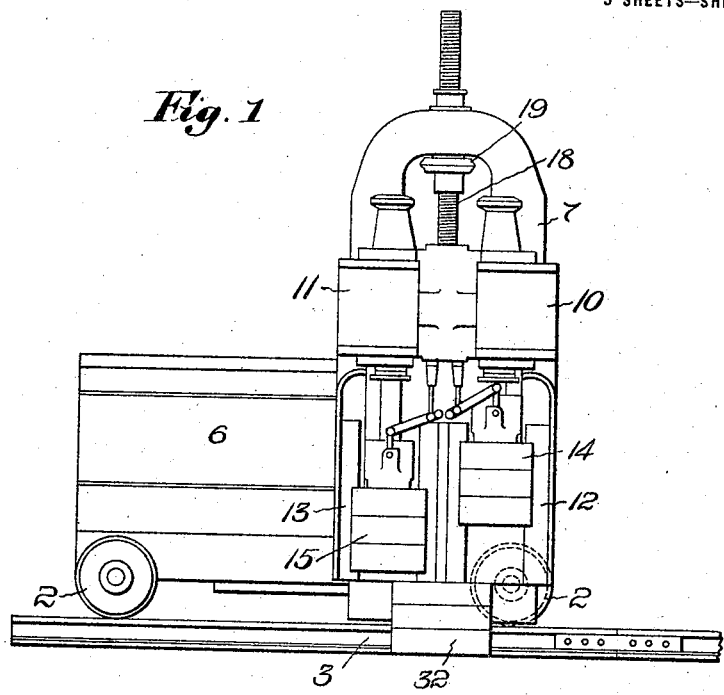
Figure 1 shows in front elevation a track channeler embodying one form of our invention.

Referring to the drawings and to the form of machine which we have there shown for the sole purpose of illustrating one embodiment of our invention, there is disclosed a track channeler comprising the main truck or frame 1 mounted upon the wheels 2, the latter adapted to move along the usual rails 3 which, when united into connected sections to form a portable trackway, are customarily laid along the quarry bottom.

Any suitable means for propelling the channeler may be employed, but herein it is shown as equipped with the self-propelling engine or motor 4 which, by means of the usual gearing, well-known in machines of this class, is connected to the axles 5 to propel the channeler in either direction along the trackway.

While the construction of the channeler as to its cutting mechanism may be of any desired type, the same is herein shown for illustrative purposes, as provided with a supporting plate 6 located at the side of the truck and serving to carry the upright standard 7, which may be adjustably bolted to the plate at either end of the machine or at any desired intermediate position. The plate is mounted for limited angular adjustment away from the vertical plane, there being provided for this purpose at either end a depending supporting projection 8 fulcrumed in a groove in the truck frame, in which latter it is firmly held when adjusted by means of usual bolts and clamps (not shown). The clamps may be loosened and the plate tipped back for angle cutting through adjustment of the brace rod or rods 9.

In the illustrated form of machine two channeling units are employed comprising pressure fluid engines having the cylinders 10 and 11, together with cross-head guides 12 and 13 which act to guide the tool-carrying cross-heads 14 and 15, all mounted upon and carried by a vertically adjustable frame 16. The latter is gibbed to slide upon longitudinally finished ways 17 and the upper end of the cylinder casting is attached to the lower end of the feed adjusting screw 18, so that the latter, together with the cylinders, frame and tools may be adjustably advanced or retracted relatively to the work. The tools during cutting are clamped in the cross-heads 14 and 15, but in Figs. 1 and 2 the machine is shown with the tools removed.

Any suitable means may be employed for feeding the tools toward the work, there being herein provided a threaded nut secured to the bevel gear 19, the latter held against longitudinal movement by the standard 7. The nut and gear are turned by the sprocket wheel 20 (Fig. 2), the latter being moved through the chain 21 and engine 4, so that the engine is available to feed the tools toward or from the work, a controlling lever 22 being employed to start, stop and reverse the tool feed.

Power in the form of steam or other pressure fluid may be supplied to the engines, either from a boiler carried upon the truck or from any other suitable near or remote source, from which it may be led to the pressure chamber of the engines by connections not shown.

The foregoing description serves to illustrate a typical form of channeling machine, it being understood, however, that our invention is not limited to any particular construction of channeler, or other stone working machine, but that it has extensive application to various types and constructions of machines in this general class.

Referring now more particularly to the improvements with which our invention is concerned, we have provided the described form of channeling machine with one or more elevating devices, preferably upon the main frame of the machine itself, by which at appropriate times and under appropriate conditions all or a portion of the weight of the machine may be temporarily withdrawn from the track to facilitate the adjustment of the latter.

Various means may be employed for thus elevating the machine, but herein we have shown means upon the frame for receiving one or more removable elevating devices, herein in the form of elevating screws. For the purpose of elevating the machine to permit advance of the trackway longitudinally, we have provided at the rear of the machine (Fig. 4) one or more openings 23 formed in the frame-work and provided with radial enlargements or notches 24. Any desired number of these openings may be provided and they may be located at any suitable points, but herein they are two in number and are placed sufficiently far apart to permit the elevating screws, when inserted therein, to support the channeler in firm equilibrium and to bring the elevating screws outside of the limits of the wheels 2, and also of the rails 3, as will be seen from Fig. 2.

When it is desired to utilize these openings for the reception of adjusting screws, or other elevating devices there is inserted in each of the openings an internally threaded sleeve or nut 25, shown in detail in Figs. 5, 6 and 7. Such sleeve is provided with radial lugs 26, spaced 180° apart, which lugs readily pass through the radial notches 24. The sleeve is then turned 90° to the position shown in Figs. 5 and 6 where the lugs 26 abut against projections or stops 27 formed upon the under side of the frame plate, there being also provided a projecting portion, such as the collar 28, projecting from the sleeve but sufficiently spaced from the lugs 26 to receive the frame plate between them. With the sleeve turned to the position shown, the collar prevents the sleeve from dropping through the opening in the plate. Preferably means, such as the pair of projecting handles 29, are employed by which the threaded sleeve can be readily grasped, inserted and turned or withdrawn.

The interior of the sleeve is threaded to have engagement with the threaded elevating or jack screw 30, the latter having the perforated head 31 or other means by which it may be engaged to be turned for raising or lowering the machine.

Figure 2:
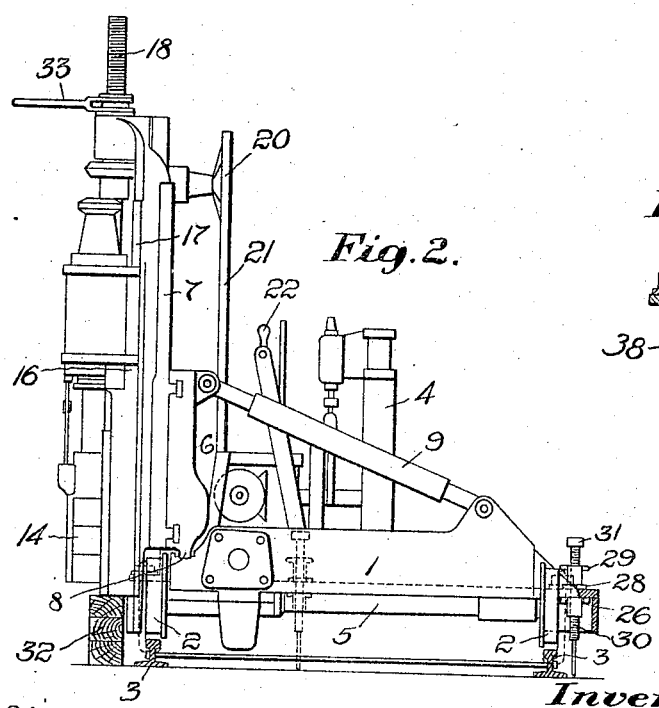
Fig. 2 is an end elevation of the channeler shown in Fig. 1.

When the machine is to be elevated for the advance of the trackway, a nut or sleeve with its screw is inserted in each of the outside openings 23 and the screws turned to elevate the machine, as represented in Fig. 2. If desired, one or more elevating devices of the same kind may be provided at the opposite or cutting side of the channeler, but to avoid complication, as well as interference with the adjustment of the standard along the plate, we herein rely upon the adjustable frame 16 to raise or lower that side of the machine. For example, when it is desired to elevate the machine, as described, the tools being then removed from the cross-heads, or not as conditions may require, wooden blocks 32 or other suitable supports are placed outside of the rail and beneath the lower edge of the frame 16, as represented in Fig. 2, whereupon the adjusting screw 18 may be turned either through the feeding engine, as described, or manually by means of the usual form of ratchet lever 33, to lower the frame and consequently raise that side of the machine.

With the machine raised, as shown in Fig. 2, both the machine and its parts are free from interference or conflict with either the rails or the stay rods and other connections extending between the rails, and the entire trackway portion without detachment of any of its parts, may be slid along the quarry bottom with the expenditure of comparatively little force. The height to which the machine is elevated is of no particular importance so long as the rails can be given the necessary movement. Ordinarily one inch or less will suffice.

As will be more fully explained, it is not only desirable to elevate the machine to facilitate the longitudinal adjustment of the track, but also to so elevate it upon a pivotal support independent of the rails so that at least a portion of the weight of the machine is taken off from the rails, and the latter may be swung around about the pivotal support of the machine.

While means may, if desired, be provided for actually elevating the machine free from the rails and also in perfect balance upon its pivot, preferably we provide a pivotal support, adapted to rest upon the quarry floor roughly or approximately near the center of gravity of the machine, and raise the machine only enough to take a large or perhaps the greater portion of the weight from the rails, while leaving the wheel flanges still subject to lateral engagement with the track. When the track is swung around under such conditions, even though the machine tips to one side so as to rest partly upon the track, its principal weight is taken upon the pivot and the engagement of the wheel flanges with the track causes the latter to turn the machine around as the track is swung about.

In the illustrated form of machine, we have shown, in addition to the openings 23 near the outside limits of the frame, additional, but similar openings 34, also formed in the frame plate 1, but located within the space between the rails and preferably roughly approximating coincidence with a vertical line passing through the center of gravity of the machine when the standard is located, as is ordinarily the case, at one end or the other of the upright frame 6.

That is to say, with the standard and its attached heavy parts located at the right-hand end of the machine, as viewed in Fig. 1, the right-hand opening 34, as seen in Fig. 4, would come sufficiently near the center of gravity of the machine, so that, with the adjusting screw placed therein, as previously described in connection with the openings 23, the machine can be elevated upon that screw alone, which latter, acting as a pivotal support, sustains the major portion of the weight of the machine, allowing the latter perhaps to tip slightly upon one rail or the other, but resting thereon with a small fraction of its total weight. With the standard at the opposite end of the machine, the opposite opening 34 can then be employed for this purpose.

Referring now more particularly to Figs. 9 to 12, the utility and importance of these improvements will be more readily understood. Referring, for example, to Fig. 9, we have represented a trackway portion composed of separate sections $a$, $a^1$, $b$, $c$, and $d$ bolted together as described, the parallel rails of each section being connected together by cross-plates and stay rods in the usual manner.

During the cutting operation, while the machine is traveling along the trackway, located as shown, and cutting the channel groove, which is represented at $e$, the elevating screws with their connected sleeves are withdrawn from the openings 23 and 34. After completion of the groove $e$ it may be necessary to remove the trackway to the dotted position shown for the purpose of cutting a groove represented at $f$. This transfer of the trackway from the one position to the other is merely illustrative of numerous conditions which arise in practice with great frequency when moving the trackway from one position to the other where there exists some intervening obstruction, such as the projecting wall or corner $g$ of the quarry. With the practice heretofore prevailing the operation would entail much time and labor, requiring the detachment of one track section from the others and the barring or prying of the trackway for a considerable distance with the weight of the machine resting upon the rails.

With the described improvements, however, the machine can first be run to a position over the section $d$ and an elevating screw inserted in one of the openings 34 to pivotally support the machine. The trackway with the machine can then be swung about to the dotted line position represented at $h$, this being accomplished with the expenditure of little force by prying about the section $a$, the track itself acting as a long lever. If irregularities in the rock are encountered, the machine can be raised a little more, to allow the rails to pass over the irregular places and then again lowered. The threads on the screw can be made large and coarse to permit this to be done quickly.

With the trackway and machine turned, the machine can then be elevated, as represented in Fig. 2, by inserting screws in the openings 23 and by using the blocks 32 under the frame 16, the elevating device, at the same time, being withdrawn from the openings 34. This permits the track to be dragged in the direction of the arrow and into the position represented by $i$, this also being accomplished with the expenditure of relatively slight power. Repetition of this operation of raising the machine, advancing the track, lowering and advancing the machine and again raising the latter and advancing the track can be carried on indefinitely, so that the trackway can be advanced as far as necessary. With the track shifted to the position shown, however, the machine can be placed over the section $d$ and again elevated upon one of the screws placed in the openings 34 and then, together with the track, swung to the dotted line position parallel with the proposed line of cut $f$. By combining these two movements, namely,— the swinging adjustment of the track and its longitudinal movement, substantially any required change in location can be effected.

Referring to Fig. 10, we have illustrated the conditions which exist where, after having cut the grooves $j$ and $k$, it becomes necessary to cut the groove $l$ with the standard $m$ or the cutting side of the machine at the wrong side of the track. Under such circumstances the short track section $d$ can be disconnected from the remaining sections, and one of the pivotal elevating screws being utilized to raise the machine, the latter, with the track section, can be readily swung about this screw as a pivot, whereupon the track can again be attached to the section, leaving the standard in the position denoted by $n$.

Referring to Fig. 11, if the groove $o$ has been completed and it becomes necessary to cut the groove $p$, the machine can be run over the section $d$, then elevated on one of its pivotal screws, the free end of the trackway then swung about, as described, approximately 90° and the trackway then barred over to the necessary position in the fashion described in connection with Fig. 9. On the other hand, if desired, the same result can be accomplished as represented in Fig. 12 by running the machine over track section $a$, elevating it on the pivotal screw, swinging it to the dotted line position shown, transferring the machine to the opposite end of the trackway or over section $d$ and then elevating it, as represented in Fig. 2, advancing the trackway in the direction of the arrow, lowering the machine and advancing it to the extreme end of the trackway, again elevating the machine and finally swinging the free end of the trackway to a position parallel with the proposed line of cut.

These are merely illustrative instances of the ease and facility with which any required adjustment of the trackway may be accomplished with a greatly reduced expenditure of time and labor over the present system now in vogue.

As mentioned in describing the purpose and function of the central elevating and pivotal screw it is not necessary that it should be located exactly at the center of gravity and, in fact, by not locating it exactly there, the machine, while resting with its principal weight on the screw and off the rails, will tip down on one side or the other to bring the flanges of the wheels against the rails and permit the latter when swung about also to swing the machine upon its pivot.

If the quarry bottom is uneven, or perhaps for other reasons, it may not be easy to cause the wheel flanges to engage the rails as they should if that alone is relied upon to swing the machine with the track. We have accordingly provided auxiliary means, to be used if needed, keeping the machine tied or fastened to the track while leaving its weight, or the greater part of its weight, on the rails.

Figure 3:
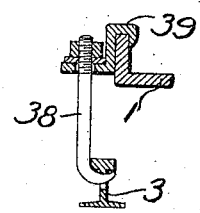
Fig. 3 is a detail of the front holding device.

This may be provided for in a variety of ways and, as illustrative of one such, we have shown the machine in Figs. 2 and 3 provided with attachments adapted to hook into suitable apertures in the rails when it is desired to swing the machine with the tracks. For the rear rail there is provided (see Figs. 4 and 8) near the outer edge of the frame an aperture 35 through which there may be inserted a grappling rod 36 having a lower inturned hooked end 37 adapted to enter an aperture drilled for that purpose in the rail, and an upper threaded end, the latter engaged by the nut and washer shown to hold it in position and by adjustment to draw the machine fast to the rail. When not used or needed the rod is removed from the aperture.

Similarly the front rail may be engaged by a like grappling rod 38 (Figs. 3 and 4) which is supported and held in a bracket 39 the latter when needed being adapted to be slipped over the upturned outer front flange of the frame (as represented in Figs. 3 and 4). When not needed the hooked rod and bracket together can be removed from the position shown.

In Fig. 2 we have indicated by dotted lines the position of these two grappling rods together with the central pivot screw when the machine is supported on the latter for swinging movement with the track. The holes in the rails with which the hooks engage may be drilled in each track section, if desired, or only in the short section designated as $d$.

In connection with quarry work, where the quarry floor slopes at an angle, it is extremely difficult to move the trackway with the weight of the machine resting upon it, since the trackway has to be freshly blocked up for every new position of the machine assumed. Through the use of our invention the track can be adjusted on an inclined floor with but little additional labor over adjustment on a level floor. Ordinarily the adjustments, which have heretofore required an additional force of men over those employed solely for operating the machine, can be effected without such additional force and with much less time, thereby greatly increasing the cutting efficiency and the commercial efficiency of the machine.

It will be seen that by the use of the relatively simple expedients described, there is effected what is virtually a new method of rapid handling for the machine with its portable trackway over the quarry floor.

While we have herein for illustrative purposes shown specifically one form of our invention and one particular application thereof, it is to be understood that the same is not limited to the details herein described or to the particular manner in which the invention is carried out, or to the specific application or use herein made of the same, but that extensive deviations may be made from the described embodiment and application of the invention without departing from the spirit thereof.

Having thus described our invention, what we claim is:

1. The combination with a transversely connected portable trackway, of a truck guided and supported thereon, channel cutting means mounted on said truck and adjustable to elevate the same, and means disposed outside one of the limits of the trackway for coöperating therewith in elevating substantially the entire weight of the machine to permit longitudinal shifting of the trackway when the machine is elevated.

2. The combination with a transversely connected portable trackway, of a truck guided and supported thereon, channel cutting means mounted on said truck and adjusting to elevate the same, power driven adjusting means therefor, and means disposed outside one of the limits of the trackway for coöperating therewith in elevating substantially the entire weight of the machine to permit longitudinal shifting of the trackway when the machine is elevated.

3. A track channeling machine or the like having a frame, cutting means, means for engaging with a suitable trackway, elevating means for elevating the machine to relieve the track of the full weight thereof, comprising an elevating screw and a threaded screw-receiving member, the latter having one or more radial lugs and also a projecting portion longitudinally spaced therefrom, and means upon the machine frame to hold said elevating means, comprising an opening therein adapted to pass said lug or lugs but not said projecting portion, and means upon the frame to permit the partial turning only of the screw-receiving member to a position where its withdrawal from the opening is prevented.

4. A track channeling machine or the like, having wheels for engaging with a suitable track-way, an elevating device for pivotally supporting said machine to relieve the track-way, and means for holding the machine to the track-way to cause the swinging of the track also to turn the machine.

5. The combination with a portable trackway comprising united sections, each section having parallel rails connected by cross members, of a stone working machine supported and guided by the trackway, cutting means, feeding means for feeding the machine along the trackway simultaneously with the operation of the cutting means, an elevating device operable outside the limits of the trackway for elevating the machine whereby the trackway can be longitudinally adjusted beneath the machine, and means operable between the rails of the trackway also for elevating the machine while leaving the same engaged with the trackway but in pivotal relation thereto whereby the machine may be turned with the turning of the trackway.

6. The combination with a portable trackway, of a truck having wheels supported and guided by said trackway, channel-cutting means supported at the side of said truck and mounted for longitudinal adjustment thereon, feeding means for feeding said truck along said trackway simultaneously with the operation of the cutting means, and truck-elevating means comprising a plurality of elevating devices operable outside of the limits of the trackway on one side thereof and within the longitudinal limits of the truck for elevating the truck whereby the trackway can be longitudinally adjusted beneath the truck, said truck having provision for receiving an elevating device between the rails of the trackway at different points within the longitudinal limits of the truck and approximately at the centers of gravity of the machine in the different positions of longitudinal adjustment of said channel-cutting means, and a pivotal elevating device adapted to operate at either of such points adjacent to either center of gravity for elevating and pivotally supporting the truck.

7. The combination with a portable trackway, of a truck having wheels supported and guided by said trackway, channel-cutting means supported at the side of said truck and mounted for longitudinal adjustment thereon, feeding means for feeding said truck along said trackway simultaneously with the operation of the cutting means, and truck-elevating means comprising a plurality of elevating devices operable outside of the limits of the trackway on one side thereof and within the longitudinal limits of the truck for elevating the truck whereby the trackway can be longitudinally adjusted beneath the truck, said truck having provision for receiving an elevating device between the rails of the trackway at different points within the longitudinal limits of the truck and approximately at the centers of gravity of the machine in the different positions of longitudinal adjustment of said channel-cutting means, a pivotal elevating device adapted to operate at either of such points adjacent to either center of gravity for elevating and pivotally supporting the truck, and means for securing said trackway to said truck whereby the trackway may be swung with the truck about the pivotal point of the latter.

8. The combination with a portable trackway, of a truck having wheels supported on and guided by said trackway, channel cutter actuating means supported at the side of the truck, feeding means for feeding the truck along the trackway simultaneously with the operation of the channel-cutting means, and truck-elevating instrumentalities comprising means for depressing said channel-cutter actuating means to cause the latter to elevate the truck on one side, and elevating means operable outside the limits of the trackway on the other side of the truck to elevate the truck on the latter side, whereby the trackway can be longitudinally adjusted beneath the truck.

9. The combination with a portable trackway, of a truck having wheels supported and guided by said trackway, channel-cutting means supported at the side of said truck and mounted for longitudinal adjustment thereon, feeding means for feeding said truck along said trackway simultaneously with the operation of the cutting means, and truck-elevating instrumentalities comprising a plurality of elevating devices operable outside of the limits of the trackway at different points longitudinally of the truck on one side, and a pivotal elevating device operable between the rails of the trackway adjacent to the center of gravity of the machine in any position of adjustment of the cutting means longitudinally of the truck.

10. The combination in an apparatus of the class described, of a channeler trackway, a truck supported track channeler movable thereon and including channel cutting mechanism at one side of said truck and trackway, and a single elevating means on the axis of which said channeler is rotatable for elevating and supporting the latter pivotally between the rails of the trackway to permit the machine to be turned.

11. The combination in an apparatus of the class described, of a track channeler having flanged wheels for engaging a suitable channeler trackway and supporting the machine thereon, a frame having cutting mechanism for cutting a groove or channel at the side of the trackway, and pivotal supporting means to elevate said channeler relative to the trackway and free the latter from the full weight thereof, while permitting engagement between the wheel flanges and track and thereby permitting the channeler to be turned about its pivotal support when the track is moved angularly.

12. The combination in an apparatus of the class described, of a truck having supporting wheels, channel cutting means supported at the side of said truck and mounted for longitudinal adjustment thereon, feeding means for feeding said truck along a suitable trackway simultaneously with the operation of the cutting means, and truck-elevating means comprising a plurality of elevating devices operable outside the limits of the trackway on one side thereof and within the longitudinal limits of the truck for elevating the truck, whereby the trackway can be longitudinally adjusted beneath the truck, said truck having provision for receiving an elevating device between the rails of the trackway at different points within the longitudinal limits of the track and approximately at the centers of gravity of the machine in the different positions of longitudinal adjustment of said channel cutting means, and a pivotal elevating device adapted to operate at either of said points adjacent either center of gravity for elevating and pivotally supporting the truck.

13. The combination in an apparatus of the class described, of a truck having supporting wheels, channel cutting means supported at the side of the truck and mounted for longitudinal adjustment thereon, feeding means for feeding said truck along a suitable trackway simultaneously with the operation of the cutting means, truck elevating means comprising a plurality of elevating devices operable outside the limits of the trackway on one side thereof and within the longitudinal limits of the truck for elevating the truck whereby the trackway can be longitudinally adjusted beneath the truck, said truck having provision for receiving an elevating device between the rails of the trackway at different points within the longitudinal limits of the track and approximately at the centers of gravity of the machine in the different positions of longitudinal adjustment of the said channel cutting means, a pivotal elevating device adapted to operate at either of such points adjacent either center of gravity for elevating and pivotally supporting the truck, and means for securing the trackway to the truck whereby the trackway may be swung with the truck about the pivotal point of the latter.

14. The combination in an apparatus of the class described, of a truck having supporting wheels, channel cutting means supported at the side of said truck and mounted for longitudinal adjustment thereon, feeding means for feeding said truck along a suitable trackway simultaneously with the operation of the cutting means, means operable outside the limits of the trackway for elevating the truck whereby the trackway can be longitudinally adjusted beneath the truck, a pivotal elevating device adapted to operate between the rails of the trackway, and means for securing the trackway to said truck whereby the trackway may be swung with the truck about the pivotal point of the latter.

15. The combination in an apparatus of the class described, of a truck having supporting wheels, channel cutter actuating means supported at the side of the truck, feeding means for feeding the truck along a suitable trackway simultaneously with the operation of the channel cutting means, and truck elevating instrumentalities comprising means for depressing said channel cutter actuating means to cause the latter to elevate the truck on one side, and elevating means operable outside the limits of the trackway on the other side of the truck to elevate the truck on the latter side, whereby the trackway can be longitudinally adjusted beneath the truck.

16. The combination in an apparatus of the class described, of a truck having supporting wheels, channel cutting means supported at the side of said truck and mounted for longitudinal adjustment thereon, feeding means for feeding said truck along a suitable trackway simultaneously with the operation of the cutting means, and truck elevating instrumentalities comprising a plurality of elevating devices operable outside the limits of the trackway at different points longitudinally of the truck on one side, and a pivotal elevating device operable between the rails of the trackway adjacent the center of gravity of the machine in any position of adjustment of the cutting means longitudinally of the truck.

In testimony whereof, we have signed our names to this specification, in the presence of two subscribing witnesses.

HENRY H. MERCER.
DANIEL J. O'ROURKE.

Witnesses as to H. H. Mercer:
  JAMES A. BRUCE,
  E. J. BURCHARD.
Witnesses as to D. J. O'Rourke:
  J. H. JEFFERY,
  O. W. AKERSON.